United States Patent
Martinussen

(10) Patent No.: US 7,990,741 B2
(45) Date of Patent: Aug. 2, 2011

(54) COMPARATOR CONTROLLED CHARGE PUMP FOR NEGATIVE VOLTAGE BOOSTER

(75) Inventor: Tore Martinussen, Oslo (NO)

(73) Assignee: Aptina Imaging Corporation, Grand Cayman (KY)

( * ) Notice: Subject to any disclaimer, the term of this patent is extended or adjusted under 35 U.S.C. 154(b) by 456 days.

(21) Appl. No.: 12/173,896

(22) Filed: Jul. 16, 2008

(65) Prior Publication Data

US 2010/0013445 A1  Jan. 21, 2010

(51) Int. Cl.
*H02M 3/18* (2006.01)
*H02M 7/00* (2006.01)
(52) U.S. Cl. ......................................................... 363/60
(58) Field of Classification Search ..................... 363/59, 363/60; 307/110; 327/536; 257/299
See application file for complete search history.

(56) References Cited

U.S. PATENT DOCUMENTS

| | | | |
|---|---|---|---|
| 5,818,288 A | 10/1998 | Le et al. | |
| 6,018,264 A | 1/2000 | Jin | |
| 6,320,796 B1 | 11/2001 | Voo et al. | |
| 6,359,814 B1 | 3/2002 | Sundaram et al. | |
| 6,853,567 B2 | 2/2005 | Kwon | |
| 6,859,091 B1 * | 2/2005 | Nicholson et al. | 327/536 |
| 6,903,599 B2 | 6/2005 | Chen et al. | |
| 7,276,960 B2 | 10/2007 | Peschke | |
| 7,279,959 B1 | 10/2007 | Choy | |
| 7,310,252 B2 | 12/2007 | Yan | |
| 2002/0060917 A1 | 5/2002 | Tanimoto | |
| 2005/0030771 A1 | 2/2005 | Conte et al. | |
| 2006/0279352 A1 | 12/2006 | Kim et al. | |
| 2008/0079479 A1 | 4/2008 | Olsen | |

FOREIGN PATENT DOCUMENTS

JP   2004 129377   4/2004

* cited by examiner

*Primary Examiner* — Harry Behm
*Assistant Examiner* — Matthew Grubb
(74) *Attorney, Agent, or Firm* — RatnerPrestia

(57) ABSTRACT

Charge pumps and methods for regulating charge pumps. The charge pump includes a voltage booster circuit and a voltage regulator circuit. The voltage booster circuit includes first and second input terminals that respectively receive a regulation voltage and an input voltage. The voltage booster circuit generates an output voltage having a polarity that is different from the input voltage. The output voltage is adjusted by the regulation voltage and provided to an output terminal. The voltage regulator circuit is coupled between the first input terminal and the output terminal of the voltage booster circuit. The voltage regulator circuit shifts the output voltage to a level shifted voltage and generates the regulation voltage responsive to the level shifted voltage.

15 Claims, 7 Drawing Sheets

COMPARATOR CONTROLLED CHARGE PUMP FOR NEGATIVE VOLTAGE BOOSTER

FIELD OF THE INVENTION

The present invention relates to the field of charge pumps and, more particularly, to methods and circuits for regulating charge pumps.

BACKGROUND OF THE INVENTION

In many electronic devices, it is desirable to generate a voltage having a magnitude that is greater than a magnitude of a supply voltage providing power to the device. In other applications, it is desirable to generate a polarity that is different from the polarity of the supply voltage providing power to a device. Charge pumps may be used for both of these purposes. Although a wide variety of charge pumps have been developed, many charge pumps use capacitors to obtain a boosted voltage or a voltage having a different polarity.

Typically, a supply voltage is sampled on a first terminal of a capacitor (by charging the capacitor to the supply voltage) during a first phase of a cycle. During a second phase of the cycle, one of the terminals is coupled to a load. If the first terminal of the capacitor is coupled to the load and the second terminal is held at ground, a boosted voltage may be generated. Because the capacitor was charged to the supply voltage during the first phase when the second terminal was connected to ground, the voltage on the first terminal is approximately twice the supply voltage during the second phase. If, during the second phase, the second terminal of the capacitor is coupled to the load and the first terminal is held at ground, a voltage with a reverse polarity may be generated. Because the capacitor was charged to the supply voltage during the first phase when the second terminal was connected to ground, the voltage on the second terminal is approximately a negative supply voltage during the second phase. The charge pump repeatedly alternates between the first and second phases, each cycle generating an output voltage that is approximately twice the supply voltage $V_{AA}$ or of a reversed polarity.

Charge pumps are presently used in a wide variety of applications. For example, charge pumps are typically used in memory devices to provide a negative substrate voltage or to provide a boosted voltage that may be applied to the gate of an NMOS transistor to allow the transistor to couple the supply voltage to an output node. Charge pumps are also used in CMOS imagers to generate voltages of different polarities and magnitudes during various operations carried out by the imagers. For example, charge pumps are commonly used to supply power having a polarity that is different from that of the supply voltage to the imaging array of CMOS imagers.

The time required for a charge pump to output a target voltage is sometimes referred to as a time constant of the charge pump. In general, the time constant of a charge pump driving a resistance load is very short as long as the current demands of the load do not exceed the current that may be supplied by the charge pump. The time constant, however, of a charge pump driving a capacitive load may be very long because the voltage applied to a load incrementally increases through a charge sharing process each cycle. The time constant of the charge pump may affect the magnitude of capacitance relative to the load capacitance, as well as the difference between the supply voltage and the load voltage to which the capacitive load has been charged. The charge pump, thus, may be slow to reach the target voltage because the charge pump may not produce more charge than the combination of the pump capacitance, supply voltage and the load voltage. In addition, charge pumps typically do not compensate for charge lost when the charge pump is inactive.

BRIEF DESCRIPTION OF THE DRAWINGS

The invention may be understood from the following detailed description when read in connection with the accompanied drawing. Included in the drawing are the following figures.

DETAILED DESCRIPTION OF THE INVENTION

Figure 1:
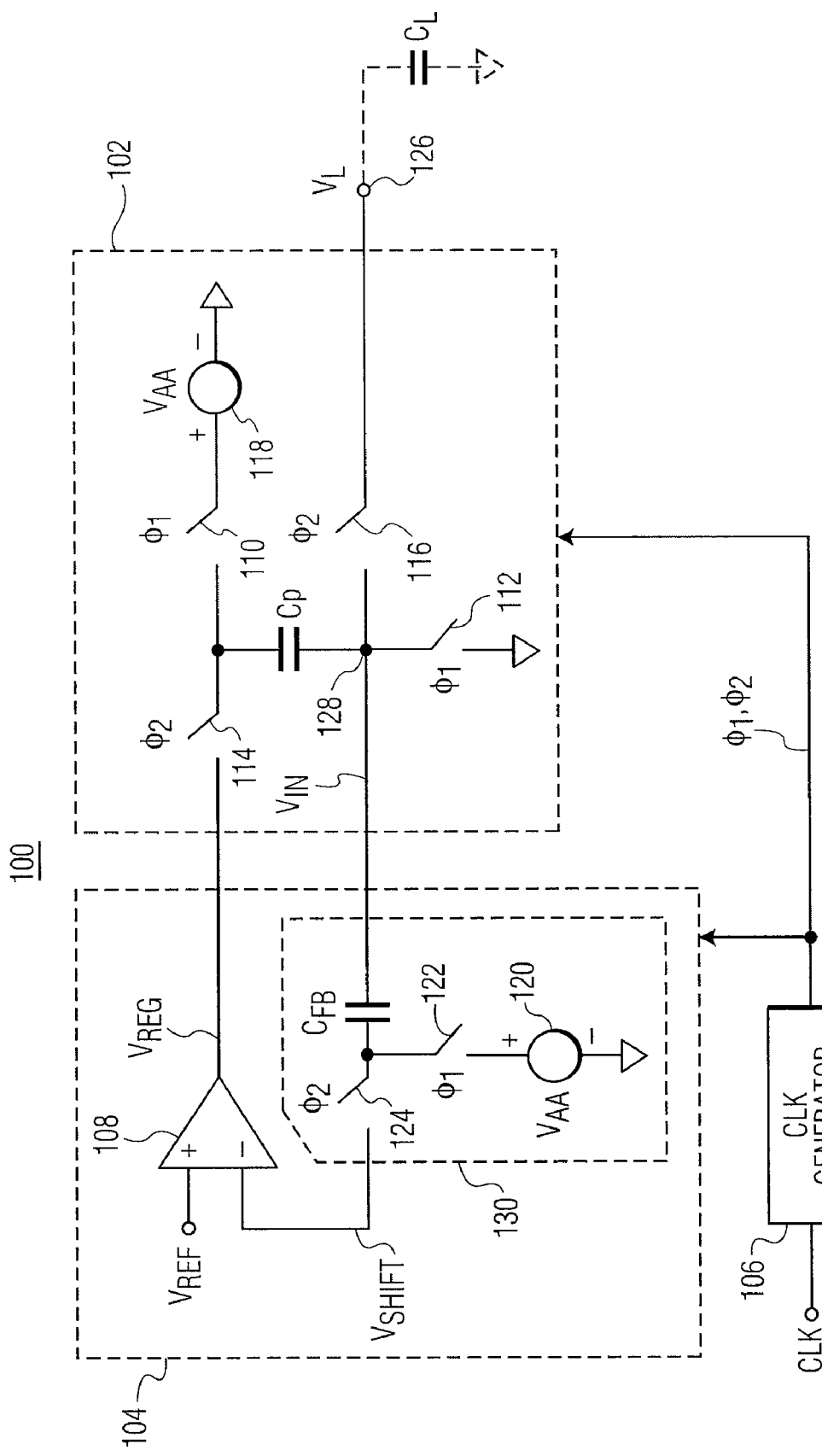
FIG. 1 is a schematic diagram of a charge pump according to one example of the invention.

FIG. 1 illustrates a charge pump, designated generally as 100, according one example of the invention. Charge pump 100 includes voltage booster circuit 102, voltage regulator circuit 104 and clock generator 106. Clock generator circuit 106 provides a set of nonoverlapping clock signals ($\phi_1$, $\phi_2$) to control voltage booster circuit 102 and voltage regulator circuit 104. Clock signals ($\phi_1$, $\phi_2$) represent a first phase ($\phi_1$) and second phase ($\phi_2$) of a cycle.

Voltage booster circuit 102 includes capacitance $C_p$, two switches 110, 112 that are closed during the first phase of each cycle and two switches 114, 116 that are closed during the second phase of cycle. Voltage booster circuit 102 may be used to supply a negative voltage when powered by a positive supply voltage 118 of voltage $V_{AA}$. A load L is connected to output node 126 of charge pump 100. Switches 110, 112 that are closed during the first phase of each cycle are open during the second phase, and switches 114, 116 that are closed during the second phase are open during the first phase. The load L is assumed to be the array of a CMOS imager, which may be highly capacitance, with a capacitance of $C_L$. The voltage across the capacitance load $C_L$ is designated as $V_L$. Voltage booster circuit 102 is coupled to voltage regulator circuit 104 via node 128 and switch 114. Voltage booster circuit 102 provides voltage $V_{IN}$ to voltage regulator circuit 104 via node 128 and receives regulator voltage $V_{REG}$ from voltage regulator circuit 104 via switch 114.

Although a capacitive load $C_L$ is illustrated in FIG. 1, load L may not be entirely capacitive. According to one embodiment, load L may include both capacitor and diode components, where the diode may introduce some charge leakage. For example, load L may correspond to transfer (TX) gates of active pixels (not shown) of a CMOS imager. In this example, voltage booster circuit 102 may be coupled to the TX gates via respective source diffusion regions of a number of driver transistors (not shown), for example, about 480-2500 driver transistors. Accordingly, there may be a significant load from respective forward-biased diffusion diodes of the corresponding pixels. For example, the area of the diodes may be large enough to produce a detectable amount of charge leakage, even for driving voltages (i.e. $V_L$) for example, of about 250 mV below a threshold voltage of the diode.

Voltage regulator circuit 104 includes supply voltage 120 of voltage $V_{AA}$, capacitor $C_{FB}$, switches 122, 124 and differential amplifier 108. Switch 122 is closed during the first phase of each cycle and switch 124 is closed during the second phase of each cycle. Switch 122 that is closed during first phase of each cycle is open during the second phase, and switch 124 that is closed during the second phase is open during the first phase. Switch 122 operates together with switch 110, 112 and switch 124 operates in together with switches 114, 116.

Capacitor $C_{FB}$, switches 122, 124 and supply voltage 120 form level shift circuit 130 that receives voltage $V_{IN}$ from voltage booster circuit 102 generates level shifted voltage $V_{SHIFT}$. Differential amplifier 108 receives a reference voltage $V_{REF}$ at the non-inverting input terminal and level shifted voltage $V_{SHIFT}$ at the inverting input terminal and produces regulation voltage $V_{REG}$. Reference voltage $V_{REF}$ represents a target voltage corresponding to a desired negative pumping voltage. Accordingly, to reach an output level of −m volts (where m is an integer), reference voltage $V_{REF}$ can be set at ($V_{AA}$−m). Capacitor $C_{FB}$ is a feedback capacitor which is used by differential amplifier 108 to detect load voltage $V_L$. In general, capacitor $C_L$ is large, for example, 100 times larger, compared to capacitor $C_P$.

As discussed above, in one embodiment, load L may include a diode component, which may introduce a charge leakage to load L. It may be appreciated that the charge leakage may increase exponentially with increasing voltage $V_L$. Accordingly, a threshold voltage for the target voltage (and thus a suitable maxiumum reference voltage $V_{REF}$) may be determined such that charge pump 100 may compensate for the charge leakage. Charge pump 100, thus, may produce a regulated load voltage $V_L$ that may substantially reduce noise due to charge leakage.

During the first phase of each cycle, supply voltage 122 is connected to an upper terminal of capacitor $C_P$ by switch 110 while switch 112 connects the lower terminal of capacitor $C_P$ to ground. Capacitor $C_P$ is therefore charged to −$V_{AA}$ during the first phase. In addition, supply voltage source 120 of voltage regulator circuit 104 is connected to one terminal of capacitor $C_{FB}$, while switch 112 connects the other terminal of capacitor $C_{FB}$ to ground (i.e., such that $V_{IN}$ is at ground). During the first phase, differential amplifier 108 is disconnected from voltage booster circuit 102 and level shift circuit 102, and capacitors $C_P$ and $C_{FB}$ are each charged to $V_{AA}$.

During the second phase of each cycle, switch 114 is closed to connect the upper terminal of capacitor $C_P$ to receive regulation voltage $V_{REG}$ and the other switch 116 is closed to connect the other terminal of capacitor $C_P$ to load L. In addition, switch 124 is closed to connect one terminal of capacitor $C_{FB}$ to the inverting input terminal of differential amplifier 108 and the other terminal of $C_{FB}$ is connected to load L and thus to load voltage $V_L$. Thus, a voltage difference of ($V_{AA}$−$V_L$) is generated across level shift circuit 130.

It may be appreciated that, during the second phase, a feedback circuit is provided by differential amplifier 108 and capacitances $C_P$, $C_{FB}$. It may also be appreciated that voltage $V_{SHIFT}$ at the inverting input of differential amplifier 108 is at a voltage $V_{AA}$ higher than $V_L$ (i.e., it is level shifted). Differential amplifier 108 provides unity gain feedback from $V_{REG}$ to $V_L$. Because of the feedback configuration, differential amplifier 108 adjusts $V_{REG}$ to compensate for any lost charge and to maintain output node 126 at a voltage of $V_{REF}$−$V_{AA}$.

In operation, when voltage regulator circuit 104 determines that load voltage $V_L$ is outside of a target voltage range, differential amplifier 108 slews to ground (for example, acting as a current sink), such that all charge across $C_P$ is pushed into load $C_L$. Accordingly, both output node 126 and level shifted voltage $V_{SHIFT}$ are reduced by ±($C_P/C_L$)·$V_{AA}$. Thus, the entire supply voltage $V_{AA}$ range is used. When the load voltage $V_L$ is within the target voltage range, differential amplifier 108, acting as a voltage buffer, generates regulation voltage $V_{REG}$ to provide sufficient charge into capacitor $C_P$ such that the inverting and non-inverting input terminals of differential amplifier 108 are maintained at a substantially same voltage.

By repeating the sequence of first and second phases using a clock, for example, of a few tens of MHz, a large amount of charge may be efficiently moved into capacitor $C_P$ while maintaining a smooth settling for the boosted voltage, when the load voltage $V_L$ is within the target voltage range. Namely, voltage regulator circuit 104 may 1) rapidly pump load L to within a target voltage range (where differential amplifer 108 acts as a current sink) and 2) apply differential amplifier 108, acting as a voltage buffer, to reach the target voltage. As described further below, a size of capacitor $C_P$, used in charge pump 100, may be reduced. Because the size of capacitor $C_P$ may be reduced, a size of an output stage of differential amplifier 108 may also be reduced, thus generating a smaller output current. Accordingly, it may be appreciated that, even with the smaller output current differential amplifier 108 may still be capable of slewing from $V_{AA}$ to ground within a clock phase.

In addition, if differential amplifier 108 has a gain that is fairly high, for example, a gain of greater than 100, voltage booster 102 may keep pumping within the full range (i.e., $V_{AA}$) until the load voltage $V_L$ is within the target voltage range. Because capacitor $C_P$ may be charged to supply voltage $V_{AA}$, a size of capacitor $C_P$ may be reduced. Because the output voltage $V_{IN}$ of voltage booster circuit 102 is level shifted by a higher predetermined value (e.g., $V_{AA}$), voltage booster circuit 102 may be operated using a regulation voltage $V_{REG}$, which generally produces for a larger voltage (compared to a target voltage) that may be used across capacitor $C_P$. Because a larger voltage may be used in voltage booster circuit 102, a capacitor size needed to reach a target voltage within the time constant may be reduced.

The devices for implementing switches 110, 112, 114, 116, 122, 124 are conventional as are circuitry for controlling them during the first and second phases of each cycle. Therefore, a more detailed explanation of these devices and control circuits have been omitted.

Figure 2:
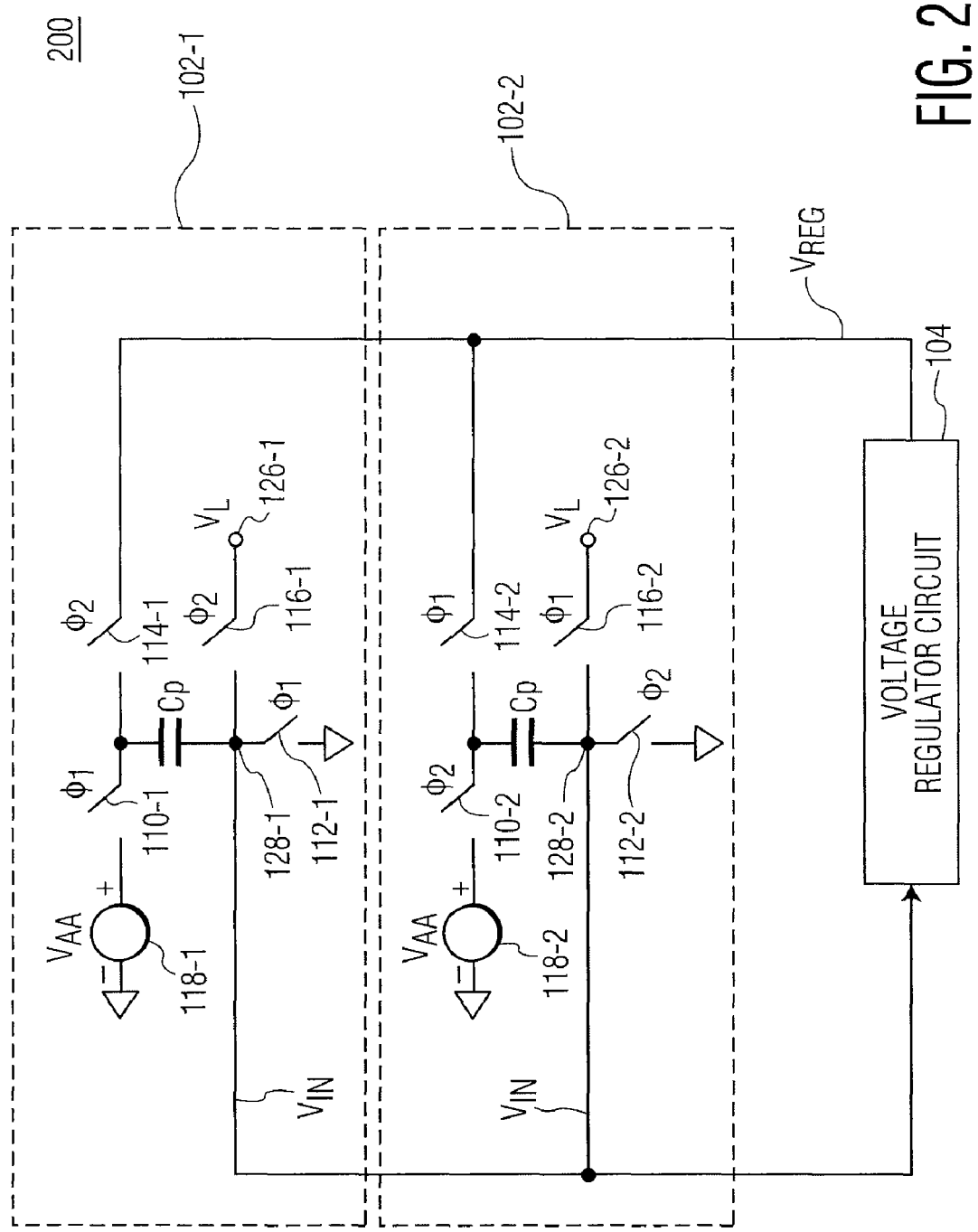
FIG. 2 is a schematic diagram of a charge pump according to another example of the invention including two voltage boosters arranged in counter-phase.

FIG. 2 illustrates a charge pump, designated generally as 200, according to another example of the invention. Charge pump 200 is the same as charge pump 100 (FIG. 1) with an exception. In addition to containing voltage booster circuit 102-1 (including switches 110-1, 112-1, 114-1, 116-1, capacitor $C_P$ and supply voltage force 118-1), charge pump 200 also includes a second voltage booster circuit 102-2. Voltage booster circuits 102-1, 102-2 are each connected to voltage regulator circuit 104. Voltage booster circuit 102-2 includes switches 110-2, 112-2, 114-2, 116-2, capacitance $C_P$ and voltage source 118-2. Switches 110-2, 112-2, 114-2, 116-2 are operated out of phase with correspondingly numbered switches 110-1, 112-1, 114-1, 116-1. As a result, capacitor $C_P$ of voltage booster circuit 102-1 applies a voltage to load L during the second phase of each cycle and capacitor $C_P$ of voltage booster circuit 102-2 applies a voltage to load L during the first phase of each cycle.

According to another embodiment, charge pumps 100, 200 (FIGS. 1 and 2) may include a gate (not shown) as part of clock generator 106 or separate from clock generator 106. The gate may be used to inactivate voltage booster circuit 102 and/or voltage regulator circuit 104 at particular times. In this manner charge pump 100, 200 (FIGS. 1 and 2) may stop pumping, for example, during sampling of a pixel output of imager array to minimize the introduction of switch noise into sampled pixels.

Figure 3:
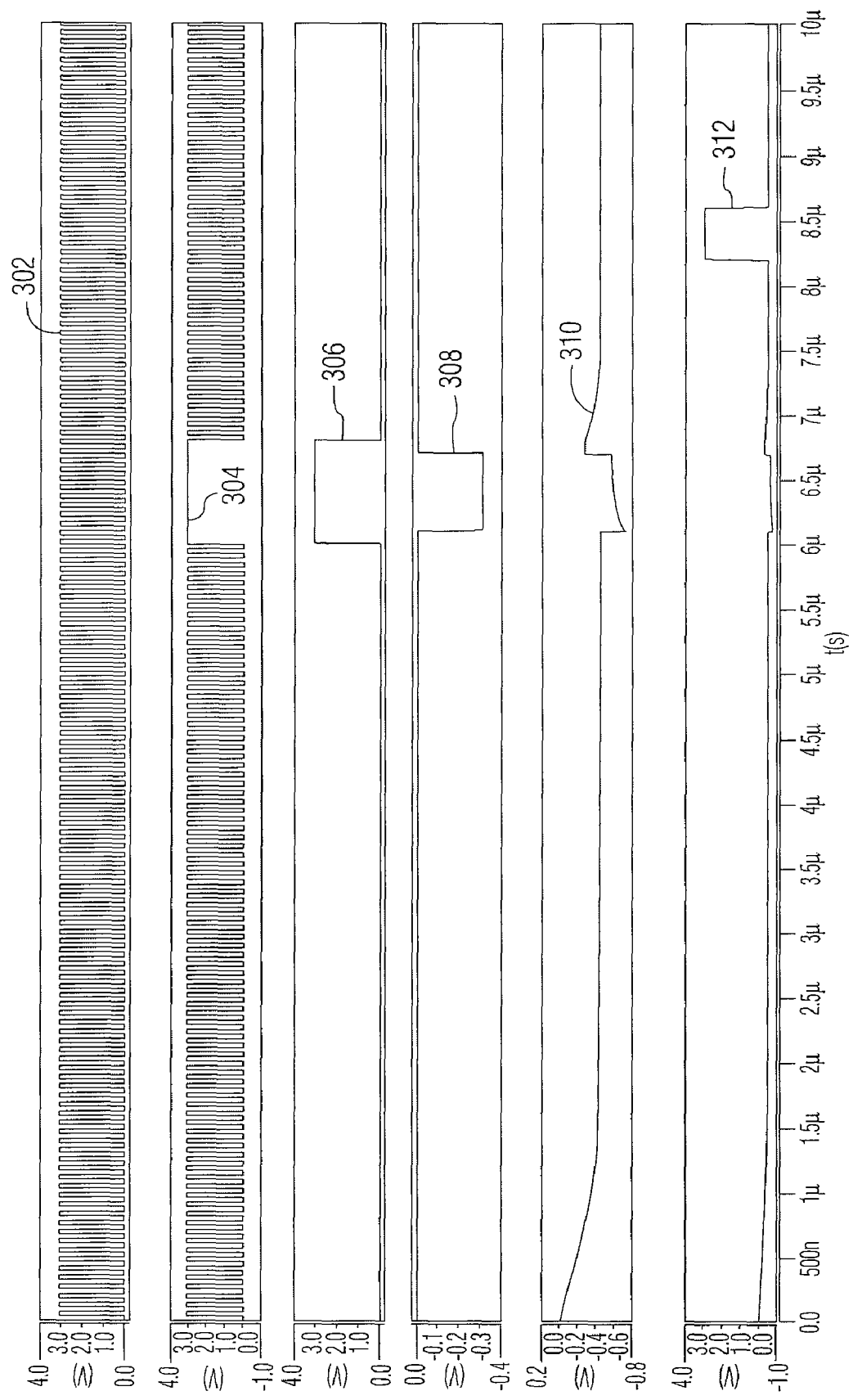
FIG. 3 is a timing diagram of control signals and generated output voltage for the circuit shown in FIG. 1.

Referring to FIG. 3, a timing diagram of generated output voltage and control signals as a function of time are shown. In particular, FIG. 3 shows input clock signal 302, pump clock signal 304 (i.e. $\phi_1$, $\phi_2$), stop clock signal 306, capacitive voltage signal 308, load voltage signal 310 (i.e. $V_L$) and output voltage signal 312. Input clock signal 302 is provided to clock generator 106 (FIG. 1). Pump clock signal 304 is used to control charge pump 100 (FIG. 1). Stop clock signal 306 is used to inactivate charge pump 100 (FIG. 1), as described above. Capacitive voltage signal 308 represents a voltage capacitively coupled to load L that cycles during sampling. Load voltage signal 310 is the load voltage $V_L$ provided by charge pump 100 (FIG. 1). Output voltage signal 312 represents a voltage of a single metal line across a CMOS imager array.

As shown in FIG. 3, load voltage signal 310 is pulled down rapidly after initialization. Load voltage signal 310 is shown to recover quickly after a hold period when a substantial amount of charge is pulled from the imager array. It may be seen that some of the coupling of the load to load voltage 310 during sampling (when stop clock signal 306 is asserted) may be accounted for by capacitive voltage signal 308. When capacitive voltage signal 308 is pulled down, it also pulls down load voltage signal 310, such that an amount of charge is leaked from output voltage signal 310. When capacitive voltage signal 308 is released, load voltage signal 310 is initially less negative than prior to stop clock signal 306 being asserted. It may be appreciated that load voltage signal 310 is then reduced, thus, compensated by charge pump 100 (FIG. 1). It may also be appreciated that charge lost to output voltage signal 312, during the assertion of stop clock signal 306, is also quickly compensated by charge pump 100 (FIG. 1).

Figure 4:
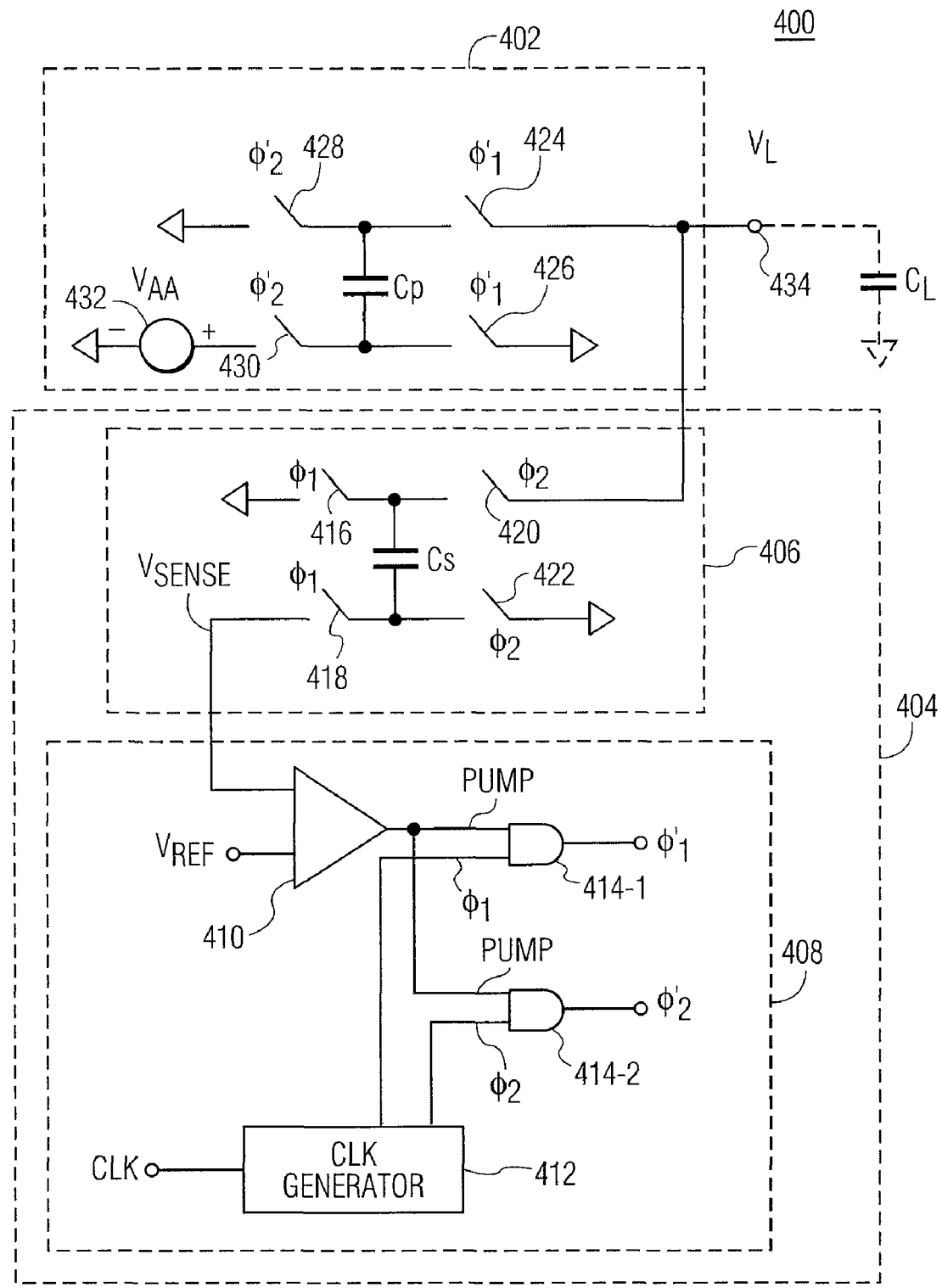
FIG. 4 is a schematic diagram of a charge pump according to a further example of the invention.

FIG. 4 is a schematic diagram of a charge pump, designated generally as 400, according to another example of the invention. Charge pump 400 includes voltage booster circuit 402 and regulator circuit 404. Voltage booster circuit 402 supplies a negative voltage to output node 434. Regulator circuit 404 generates a set of pump clock signals ($\phi_1'$, $\phi_2'$) to control voltage booster circuit 402. A capacitive load $C_L$ is connected to output node 434 of charge pump 400 and the voltage across capacitance load $C_L$ is designated as $V_L$.

As described further below, pump clock signals ($\phi_1'$, $\phi_2'$) are generated to activate and control operation of voltage booster circuit 402 when the load voltage $V_L$ at node 434 is less than a reference voltage $V_{REF}$. When load voltage $V_L$ is greater than or equal to reference voltage $V_{REF}$, pump clock signals ($\phi_1'$, $\phi_2'$) are set to a low value (i.e. 0) and voltage booster circuit 402 is inactive. Pump clock signals ($\phi_1'$, $\phi_2'$) represent a first phase ($\phi_1'$) and second phase ($\phi_2'$) of an active pump cycle.

Voltage booster circuit 402 includes supply voltage 432 of voltage $V_{AA}$, capacitor $C_P$, two switches 424, 426 that are closed during the first phase ($\phi_1'$) of the pump cycle and two switches 428, 430 that are closed during the second phase (®$_2'$) of the pump cycle. Switches 424, 426 that are closed during the first phase of each cycle are open during the second phase. Switches 428, 430 that are closed during the second phase are open during the first phase.

Regulator circuit 404 includes voltage detector circuit 406 and clock generator circuit 408. Voltage detector circuit 406 receives and samples load voltage $V_L$ from node 434 and provides a detected voltage $V_{SENSE}$ to clock generator circuit 408. Clock generator circuit 408 generates a set of clock signals ($\phi_1$, $\phi_2$) to control voltage detector circuit 408 and the set of pump clock signals ($\phi_1'$, $\phi_2'$) to control voltage booster circuit 402. Clock signals ($\phi_1$, $\phi_2$) represent a first phase ($\phi_1$) and second phase ($\phi_2$) of a clock cycle. As described further below, clock signals ($\phi_1$, $\phi_2$) are generated each clock cycle. Clock signals ($\phi_1'$, $\phi_2'$), however, are activated when $V_L$ is less than reference voltage $V_{REF}$. Accordingly, regulator circuit 404 detects the load voltage $V_L$ and determines whether to activate or deactivate voltage booster circuit 402.

Voltage detector circuit 406 includes capacitor $C_s$, first set of switches 416, 418 and second set of switches 420, 422. Voltage detector circuit 406 receives and samples load voltage $V_L$ on capacitor $C_s$ according to the set of clock signals ($\phi_1$, $\phi_2$). Switches 416, 418 that are closed during the first phase of each cycle are open during the second phase. Switches 420, 422 that are closed during the second phase of each cycle are open during the first phase. During the second phase, capacitor $C_s$ samples load voltage $V_L$ when switches 420, 422 are closed. During the first phase, switches 416, 418 are closed and the detected voltage sampled by capacitor $C_s$ is inverted and provided to clock generator circuit 408 as detected voltage $V_{SENSE}$.

Clock generator circuit 408 includes comparator 410, clock generator 412 and AND gates 414-1, 414-2. Comparator 410 compares detected voltage $V_{SENSE}$ with reference voltage $V_{REF}$ and generates a pump signal (pump). Comparator 410 generates a high pump signal (i.e., 1) when $V_{SENSE}$ is less than $V_{REF}$. Comparator 410 generates a low pump signal (i.e., 0) when $V_{SENSE}$ is greater than or equal to $V_{REF}$. Clock generator 412 generates the set of clock signals $\phi_1$, $\phi_2$ which is provided to voltage detector circuit 406, regardless of the state of the pump signal. Clock signals $\phi_1$, $\phi_2$ are gated with the pump signal by AND 414-1, 414-2, respectively, to produce the set of pump clock signals $\phi_1'$, $\phi_2'$ used to control operation of voltage booster circuit 402. Clock generator circuit 408 sets the set of pump clock signals $\phi_1'$, $\phi_2'$ to zero when the pump signal is low, thus causing pumping of voltage booster circuit 402 to cease.

Reference voltage $V_{REF}$ represents a target voltage for the load voltage $V_L$ at output node 434. Although in one embodiment, $V_{REF}$ is a positive value of 400 mV, it is understood that any suitable reference voltage may be used, based on the load voltage. As described above, load L may also include a diode component that may generate a charge leakage. Accordingly, a suitable $V_{REF}$ may also be based on the charge leakage from the diode component.

In operation, the set of clock signals $\phi_1$, $\phi_2$ for clock generation circuit 406 continues for each cycle such that voltage detector circuit 406 continually detects load voltage $V_L$. Voltage booster circuit 402, however, is activated when the pump signal is high.

When the pump signal is high and during the second phase of the pump cycle, supply voltage 432 is connected to capacitor $C_P$ by switch 430, while switch 428 connects the other terminal of capacitor $C_P$ to ground. Capacitor $C_P$ is therefore charged to $-V_{AA}$ during the second phase of the pump cycle. During the first phase of the pump cycle, switch 426 is closed to connect the lower terminal of capacitor $C_P$ to ground and switch 424 is closed to connect the other terminal of capacitor $C_P$ to load L.

In another embodiment, charge pump 400 may include first and second voltage booster circuits 402 (not shown), each connected to regulator circuit 404. The first and second voltage booster circuits 402 are similar to each other except that they are operated out of phase. Accordingly, first and second voltage booster circuits 402 may apply a voltage to load L, as described above, during the first and second phases of each cycle, respectively.

According to one embodiment, when charge pump 400 is used with an imager array, clock generator circuit 408 may be configured with a gate (not shown) to inactivate voltage booster circuit 402 at particular times. In this manner, charge pump 400 may stop pumping, for example, during sampling of a pixel output of imager array to minimize the introduction of switch noise into sampled pixels.

Figure 5:
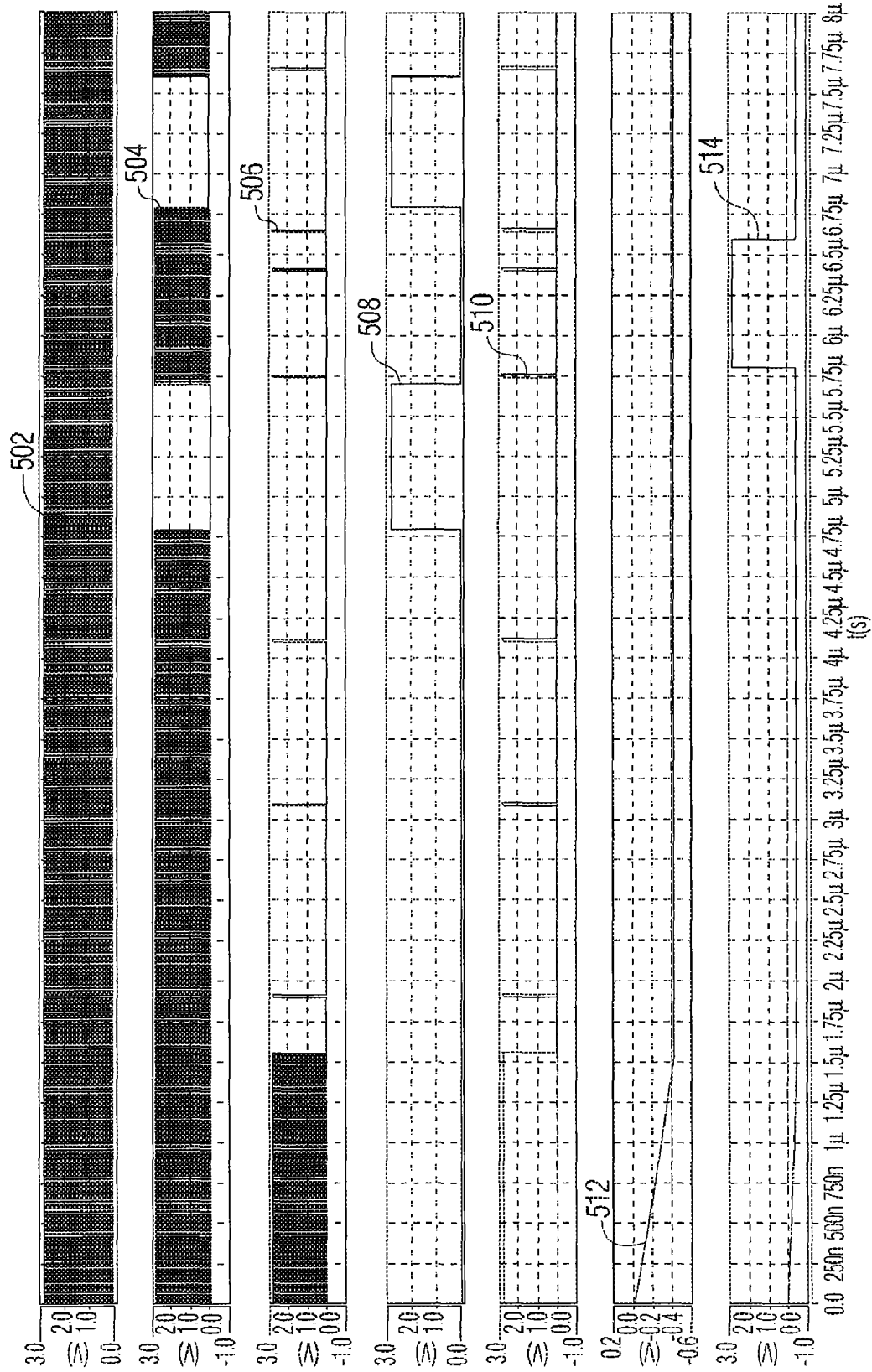
FIG. 5 is a timing diagram of generated output voltage and clock signals for the circuit shown in FIG. 4.

Referring to FIG. 5, a timing diagram of a charge pump output voltage and clock sequences are shown for charge pump 400. In particular, FIG. 5 shows input clock signal 502, sense clock signal 504 (i.e., $\phi_1$, $\phi_2$), pump clock signal 506 (i.e. $\phi_1'$, $\phi_2$), stop clock signal 508, pump signal 510, load voltage signal 512 (i.e. $V_L$) and output voltage signal 514. Input clock signal 502 is provided to clock generator 412 (FIG. 4). Sense clock signal 504 is used to control voltage detector circuit 406 (FIG. 4). Pump clock signal 506 is used to control voltage booster circuit 402 (FIG. 5). Stop clock signal 508 is used to inactivate charge pump 400 (FIG. 4), as described above. Pump signal 510 is used in clock generator ciruict 408 (FIG. 4) that is used to produce pump clock signal 506. Load voltage signal 512 is the load voltage $V_L$ provided by charge pump 400 (FIG. 4). Output voltage signal 514 represents a voltage of a single metal line across a CMOS imager array.

To produce the timing diagram shown in FIG. 5, voltage booster circuit 402 has a capacitance $C_P$ of 20 pF and a capacitive load $C_L$ of 5 nF. As shown in FIG. 5, voltage booster circuit 402 is capable of pulling down capacitive load $C_L$ to −0.5 V in less than 1.75 microseconds (load voltage signal 512). After load voltage signal 512 has reached the reference voltage, pump signal 510 is inactivated. When switching a load of 2 pF, voltage booster 402 (FIG. 4) may compensate for lost charge within about 2 cycles. In contrast, conventional charge pumps typically have a start up time of about 30 microsecond with a 140 pF capacitor $C_P$.

As described above, although a capacitive load $C_L$ is shown in FIG. 4, load L may include a diode component that may contribute charge leakage. As shown in FIG. 5, pump signal 510 may be activated at some interval to compensate for the charge leakage. FIG. 5 also illustrates that pump signal 510 may be triggered after release of stop clock signal 508, in order to compensate for any charge leakage during inactivation of charge pump 400 (FIG. 4). Furthermore, cycling of output voltage signal 514 may cause some charge leakage by the metal lines across the CMOS array. Accordingly, pump signal 510 is activated in order to compensate for the charge leakage during cycling of output voltage signal 514.

Figure 6:
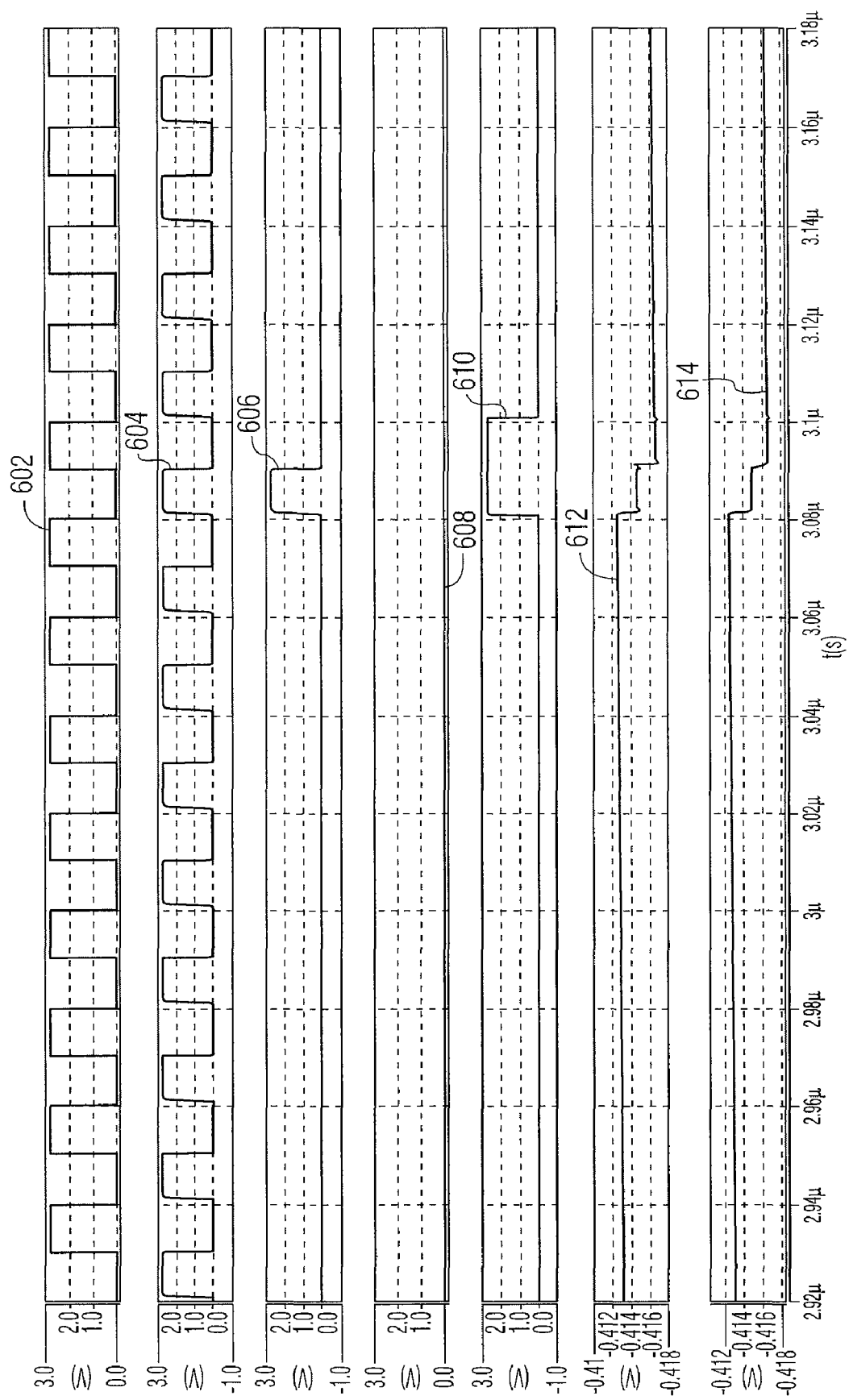
FIG. 6 is a timing diagram of a voltage step signal generated by the charge pump shown in FIG. 4 when pumping charge from a load.

Referring to FIG. 6, a timing diagram illustrating a voltage step when pumping charge from a load is shown, for charge pump 400 (FIG. 4). In particular, FIG. 6 shows input clock signal 602, sense clock signal 604 (i.e., $\phi_1$, $\phi_2$), pump clock signal 606 (i.e. $\phi_1'$, $\phi_2'$), stop clock signal 608, pump signal 610, load voltage signal 612 (i.e. $V_L$) and output voltage signal 614. Signals 602-614 are similar to signals 502-514, except that a different capacitive load is used. To produce the timing diagram shown in FIG. 6, voltage booster 402 has a capacitance $C_P$ of 20 pF and a capacitive load $C_L$ of 4 nF.

As shown in FIG. 6, load voltage signal 612 slowly drifts upwards due to charge leakage (due to a diode component of load L) before it is pumped down (by activating pump signal 610) at about 3.08 microseconds. A small difference is illustrated between the transient responses (for example, between about 3.08 microseconds and about 3.1 microseconds) of load voltage signal 612 and output voltage signal 614. The difference in the transient responses may be due to a resistance, capacitance (RC) delay between charge pump 400 (FIG. 4) and output voltage 614. The RC delay may reduce an amount of overshoot in output voltage 614 as compared with load voltage signal 612.

Although not specifically shown in the drawings, it will be understood that charge pumps 100, 200, 400 or a charge pump according to another example of the invention may be adapted to provide a positive rather than negative load voltage $V_L$. Further, by adding additional switches and a capacitor, charge pumps 100, 200, 400 or a charge pump according to the other example of the invention may generate both positive and negative voltages.

Figure 7:
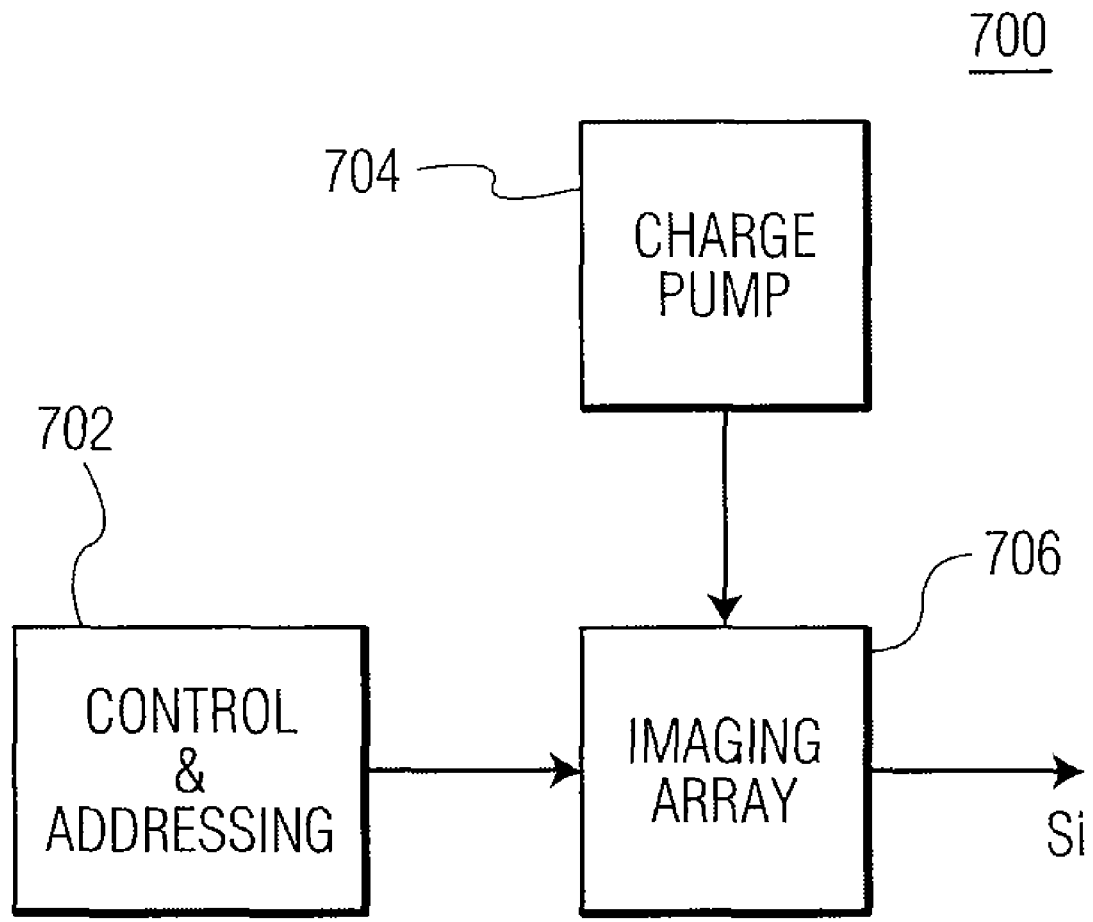
FIG. 7 is a block diagram of a CMOS imager using one or more of the charge pumps shown in FIG. 1, 2 or 4 or a charge pump according to another example of the invention.

Charge pumps 100, 200, 400 or a charge pump according to some other example of the invention can be used in a wide variety of applications. They are particularly suitable for use in a CMOS imager because the imaging arrays of such devices are highly capacitive (as well as typically including a diode component that may generate a charge leakage). For example, CMOS imager 700 shown in FIG. 7 include CMOS imaging array 706 that responds to a received image to generate corresponding signals. Array 706 is coupled to control and addressing circuit 702, which interrogates imaging array 706 to output signal $S_i$ corresponding to the image received by imaging array 706. CMOS imager 700 also includes charge pump 704 connected to imaging array 706 to supply imaging array 706 with a negative voltage. Charge pump 704 may be one of charge pumps 100, 200, 400 shown in respective FIG. 1, 2 or 4 or a charge pump according to some other example of the invention.

Although the invention is illustrated and described herein with reference to specific embodiments, the invention is not intended to be limited to the details shown. Rather, various modifications may be made in the details within the scope and range of equivalents of the claims and without departing from the invention.

What is claimed:
1. A charge pump comprising:
a voltage booster circuit having a first input terminal to receive a regulation voltage and a second input terminal to receive an input voltage, the voltage booster circuit generating an output voltage having a polarity that is different from the input voltage, the output voltage adjusted by the regulation voltage and provided to an output terminal; and
a voltage regulator circuit coupled between the first input terminal and the output terminal of the voltage booster circuit, the voltage regulator circuit shifting the output voltage to a level shifted voltage and generating the regulation voltage responsive to the level shifted voltage;
wherein the voltage regulator circuit comprises:
a level shift circuit that receives the output voltage from the voltage booster circuit and generates the level shifted voltage; and
a differential amplifier having an output terminal on which the regulated voltage is generated, the differential amplifier having a first input terminal coupled to a reference voltage and a second input terminal coupled to receive the level shifted voltage from the level shift circuit; and
wherein the level shift circuit comprises:

a capacitor having first and second terminals, the first terminal of the capacitor being coupled to the output terminal of the voltage booster circuit;

a first switch coupled between the second terminal of the capacitor and a fixed voltage, the first switch being closed during a first phase of each of a plurality of cycles; and a second switch coupled between the second terminal of the capacitor and the second input terminal of the differential amplifier, the second switch being closed during a second phase of each of the plurality of cycles.

2. The charge pump according to claim 1, wherein the voltage regulator circuit adjusts the output voltage to be proportional to a difference between a reference voltage and the input voltage when the output voltage is within a predetermined range of a target voltage.

3. The charge pump according to claim 1, wherein the voltage regulator circuit adjusts the output voltage to be proportional to a magnitude of the input voltage when the output voltage is outside of a predetermined range of a target voltage.

4. The charge pump according to claim 1, further comprising a clock generator that provides first and second nonoverlapping phase signals to control the voltage booster circuit and the voltage regulator circuit.

5. The charge pump according to claim 1, further comprising an out-of-phase voltage booster circuit, the out-of-phase voltage booster circuit coupled in parallel with the voltage booster circuit and operating out-of-phase with the voltage booster circuit.

6. The charge pump according to claim 1, wherein the differential amplifier provides unity gain feedback.

7. A charge pump comprising:

a voltage booster circuit having a first input terminal to receive a regulation voltage and a second input terminal to receive an input voltage, the voltage booster circuit generating an output voltage having a polarity that is different from the input voltage, the output voltage adjusted by the regulation voltage and provided to an output terminal;

a voltage regulator circuit coupled between the first input terminal and the output terminal of the voltage booster circuit, the voltage regulator circuit shifting the output voltage to a level shifted voltage and generating the regulation voltage responsive to the level shifted voltage; and first and second capacitors connected in series at a single node;

wherein the single node is selectively coupled to provide the output voltage;

an end terminal of the first capacitor is selectively coupled to receive the regulation voltage; and an end terminal of the second capacitor is selectively coupled to provide the level shifted voltage.

8. The charge pump according to claim 7, wherein the voltage regulator circuit adjusts the output voltage to be proportional to a difference between a reference voltage and the input voltage when the output voltage is within a predetermined range of a target voltage.

9. The charge pump according to claim 7, wherein the voltage regulator circuit adjusts the output voltage to be proportional to a magnitude of the input voltage when the output voltage is outside of a predetermined range of a target voltage.

10. The charge pump according to claim 7, further comprising a clock generator that provides first and second non-overlapping phase signals to control the voltage booster circuit and the voltage regulator circuit.

11. The charge pump according to claim 7, further comprising an out-of-phase voltage booster circuit, the out-of-phase voltage booster circuit coupled in parallel with the voltage booster circuit and operating out-of-phase with the voltage booster circuit.

12. The charge pump according to claim 7, wherein the voltage regulator circuit comprises:

a level shift circuit that receives the output voltage from the voltage booster circuit and generates the level shifted voltage; and a differential amplifier having an output terminal on which the regulated voltage is generated, the differential amplifier having a first input terminal coupled to a reference voltage and a second input terminal coupled to receive the level shifted voltage from the level shift circuit.

13. The charge pump according to claim 12, wherein the differential amplifier provides unity gain feedback.

14. The charge pump according to claim 12, wherein the level shift circuit comprises:

the second capacitor having first and second terminals, the first terminal of the second capacitor being coupled to the output terminal of the voltage booster circuit;

a first switch coupled between the second terminal of the second capacitor and a fixed voltage, the first switch being closed during a first phase of each of a plurality of cycles; and a second switch coupled between the second terminal of the second capacitor and the second input terminal of the differential amplifier, the second switch being closed during a second phase of each of the plurality of cycles.

15. The charge pump according to claim 7, wherein the voltage booster circuit comprises:

the first capacitor having first and second terminals, the second terminal being the output terminal of the voltage booster circuit.

* * * * *